United States Patent
Allen et al.

(10) Patent No.: US 9,071,096 B2
(45) Date of Patent: Jun. 30, 2015

(54) CLAMPING STRUCTURE FOR A STATOR CORE

(75) Inventors: David Thomas Allen, Longwood, FL (US); Travis John Vitello, Debary, FL (US)

(73) Assignee: Siemens Energy, Inc., Orlando, FL (US)

(*) Notice: Subject to any disclaimer, the term of this patent is extended or adjusted under 35 U.S.C. 154(b) by 480 days.

(21) Appl. No.: 13/529,416

(22) Filed: Jun. 21, 2012

(65) Prior Publication Data

US 2013/0113334 A1 May 9, 2013

Related U.S. Application Data

(60) Provisional application No. 61/557,590, filed on Nov. 9, 2011.

(51) Int. Cl.
*H02K 1/06* (2006.01)
*H02K 1/18* (2006.01)

(52) U.S. Cl.
CPC ............ *H02K 1/185* (2013.01); *H02K 2213/09* (2013.01)

(58) Field of Classification Search
CPC ....................................... H02K 1/16
USPC ................ 310/216.114, 216.118, 216.124, 310/216.134, 216.136
See application file for complete search history.

(56) References Cited

U.S. PATENT DOCUMENTS

| | | | |
|---|---|---|---|
| 2,761,987 A * | 9/1956 | Beckwith | 310/216.124 |
| 3,099,760 A | 7/1963 | Hoffman | |
| 3,237,035 A | 2/1966 | Hoffman | |
| 3,260,875 A | 7/1966 | Evans | |
| 4,126,799 A | 11/1978 | Iogansen et al. | |
| 4,406,960 A | 9/1983 | Gillet et al. | |
| 4,710,664 A * | 12/1987 | Cox et al. | 310/216.119 |
| 5,185,547 A | 2/1993 | Carbonell et al. | |
| 6,346,760 B1 * | 2/2002 | Boardman, IV | 310/216.007 |
| 7,872,392 B2 | 1/2011 | Haldemann et al. | |
| 2011/0241455 A1 | 10/2011 | Yoshida et al. | |
| 2011/0278982 A1 * | 11/2011 | Stachyra et al. | 310/254.1 |

FOREIGN PATENT DOCUMENTS

EP 0250982 B1 1/1988

* cited by examiner

*Primary Examiner* — Jose Gonzales Quinone

(57) ABSTRACT

A generator is provided comprising: a frame; a stator core comprising laminations; and clamping structure to axially clamp the laminations together. The clamping structure may comprise: a plurality of first finger plates engaging a first end of the stator core; a first spacer plate associated with the first finger plates and including a plurality of spaced apart first recesses; a plurality of first engagement structures, each comprising a bolt and a corresponding slidable bushing; a first spring ring in engagement with the first engagement structures; and first load-applying structure coupled to the frame to imparts a load to the first spring ring.

17 Claims, 4 Drawing Sheets

CLAMPING STRUCTURE FOR A STATOR CORE

CROSS-REFERENCE TO RELATED APPLICATIONS

This application claims the benefit of U.S. Provisional Application No. 61/557,590, filed Nov. 9, 2011, which is incorporated herein by reference.

FIELD OF THE INVENTION

The invention relates generally to an electric generator and more particularly to a stator core comprising laminations axially clamped via clamping structure.

BACKGROUND OF THE INVENTION

A turbogenerator may comprise a gas turbine engine coupled to an electric generator. A portion of a prior art electric generator 10 is illustrated in FIG. 1. The electric generator 10 comprises a stator core 12 including a plurality of laminations 14. First clamping structure engages a first end of the stator core. The first clamping structure comprises first finger plates 16 and a first spacer plate 18 in engagement with the first finger plates 16. Force is applied to the first spacer plate 18 via a spring ring 20, an annular clamp ring 22, a plurality of mounting bars 24 fixed to a stator frame, and studs 26 and nuts 28. A protrusion 18A extends axially from the first spacer plate 18 and engages with a corresponding groove 20A in the spring ring 20. Second clamping structure (not shown), constructed in a similar manner to the first clamping structure, engages a second end of the stator core.

SUMMARY OF THE INVENTION

In accordance with a first aspect of the present invention, a generator is provided comprising: a frame; a stator core comprising laminations stacked in the frame; and clamping structure to axially clamp the laminations together. The clamping structure may comprise: a plurality of first finger plates positioned adjacent to one another and engaging a first end of the stator core; a first spacer plate associated with the first finger plates; a plurality of first engagement structures slidable relative to the first spacer plate; a first spring ring in engagement with the first engagement structures; and first load-applying structure coupled to the frame to impart a load to the first spring ring. The spring ring may transfer the load to the stator core via the first engagement structures, the first spacer plate and the first finger plates. The plurality of first engagement structures may be capable of radial movement with the first spring ring and relative to the first spacer plate as the load is imparted to the first spring ring.

The first spacer plate may be ring-shaped and comprises a plurality of first recesses circumferentially spaced-apart from one another.

Each of the first engagement structures may be generally aligned with a gap between adjacent finger plates.

Each of the first recesses may have an oval shape with its longest dimension extending radially.

Each of the first engagement structures may comprise a bushing capable of sliding movement relative to the first spacer plate and a bolt in threaded engagement with the bushing. The bolt may have a first end in contact with the first spring ring and a second end having an O-ring coupled to it.

The first spring ring may comprise an annular dished ring.

The first load-applying structure may comprise: a plurality of mounting bars fixed to the frame; an annular first clamp ring; a plurality of first core studs extending through the first clamp ring and threadedly engaging the mounting bars; and a plurality of first nuts coupled to the core studs so as to cause the clamp ring to apply the load to the first spring ring.

The first finger plates are bolted to the spacer plate.

The clamping structure may further comprise: a plurality of second finger plates positioned adjacent to one another and engaging a second end of the stator core; a second spacer plate associated with the second finger plates and including a plurality of spaced apart second recesses; a plurality of second engagement structures, each positioned within a corresponding second recess of the second spacer plate, the second engagement structures being slidable relative to the second spacer plate; a second spring ring in engagement with the second engagement structures; and second load-applying structure coupled to the frame to impart a load to the second spring ring. The second spring ring transfers the load to the stator core via the second engagement structures, the second spacer plate and the second finger plates. The plurality of second engagement structures may be capable of radial movement with the second spring ring and relative to the second spacer plate as the load is imparted to the second spring ring.

In accordance with a second aspect of the present invention, a generator is provided comprising: a frame; a stator core comprising laminations stacked in the frame; and clamping structure to axially clamp the laminations together. The clamping structure may comprise: a plurality of first finger plates positioned adjacent to one another and engaging a first end of the stator core; a first spacer plate associated with the first finger plates and including a plurality of spaced apart first recesses; a plurality of first engagement structures, each positioned within a corresponding first recess and comprising a bolt and a slidable bushing; a first spring ring in engagement with the first engagement structures; and first load-applying structure coupled to the frame to imparts a load to the first spring ring.

The bolt may have a first end in contact with the first spring ring. Each of the first engagement structures may further comprise an O-ring coupled to a second end of the bolt so as to prevent the bolt and corresponding bushing from dropping out of the corresponding recess prior to the spring ring being positioned adjacent the first engagement structures.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 2:
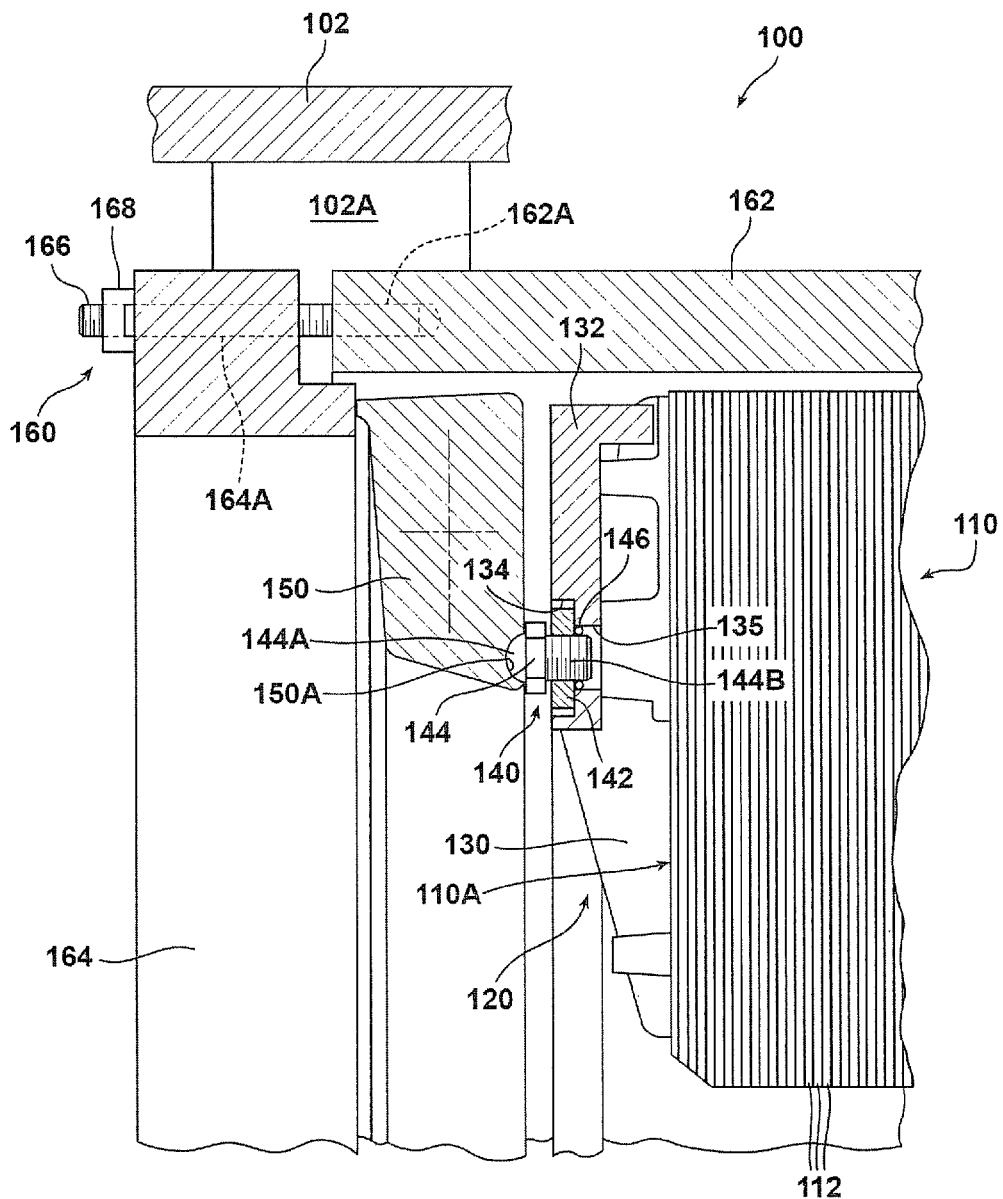
FIG. 2, partially in cross section, illustrates a portion of an electrical generator of the present invention prior to a significant load being applied to the spring ring.

A portion of an electric generator 100 adapted to form part of a turbogenerator and constructed in accordance with the present invention is illustrated in FIG. 2. The generator 100 comprises a fixed frame 102, a stator core 110 comprising a plurality of laminations 112 stacked in the frame 102 and clamping structure 120 to axially clamp the laminations together.

The frame 102 may define a shell as taught in U.S. Pat. No. 3,237,035, the entire disclosure of which is incorporated by reference herein.

Figure 3:
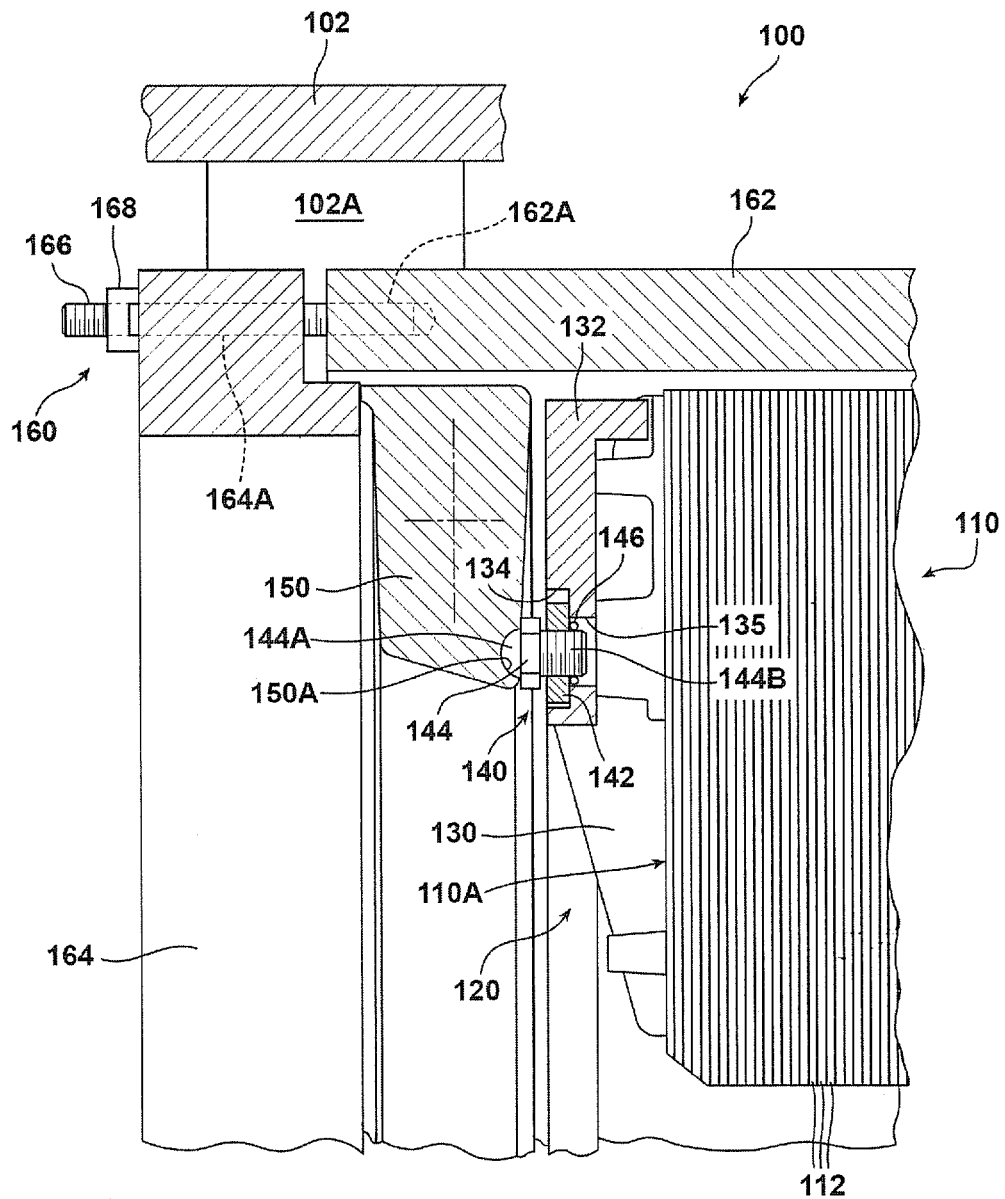
FIG. 3, partially in cross section, illustrates a portion of an electrical generator of the present invention after a load has been applied to the spring ring.
Figure 4:
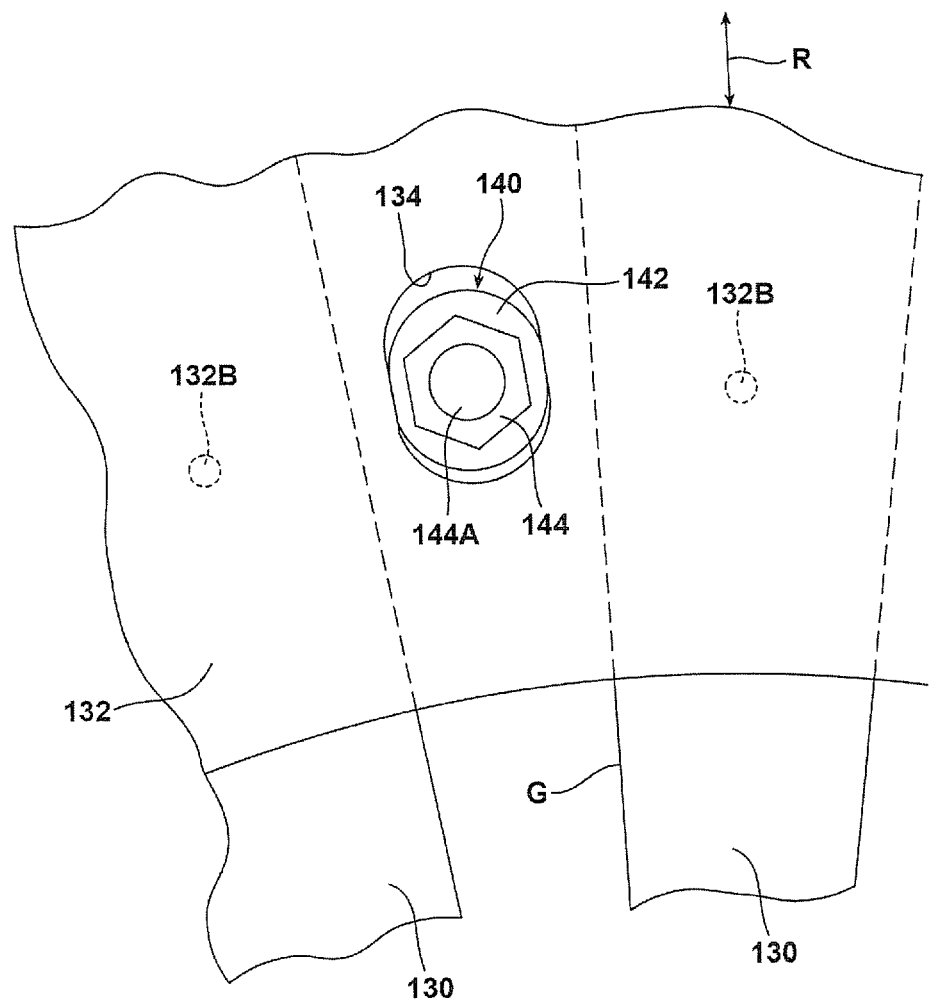
FIG. 4 is a view of a section of a first spacer plate and a first engagement structure.

The clamping structure 120 comprises a plurality of first finger plates 130, see FIGS. 2-4. The first finger plates 130 may be circumferentially positioned adjacent to one another with a gap G between adjacent finger plates 130 and engage a first end 110A of the stator core 110, see U.S. Pat. No. 2,761,987, the entire disclosure of which is incorporated by reference herein. A first spacer plate 132, which is ring-shaped in the illustrated embodiment, is coupled to the first finger plates 130 via bolts 132B, see FIG. 4. In the illustrated embodiment, the head of each bolt 132B engages with a corresponding finger plate 130 and the threaded stem of the bolt 132B is threaded into a bore in the first spacer plate 132.

The first spacer plate 132 includes a plurality of circumferentially spaced-apart first recesses 134 in the illustrated embodiment. As is illustrated in FIG. 4, each of the first recesses 134 may have an oval shape, with the longest dimension extending in a radial direction R. In the illustrated embodiment, a corresponding first bore 135 is aligned with and extends from each recess 134, see FIGS. 2 and 3. Instead of providing a plurality of first bores 135, a plurality of further recesses extending from the first recesses 134 or a circumferentially extending slot may be provided.

A plurality of first engagement structures 140 are provided, each positioned within a corresponding first recess 134 of the first spacer plate 132. In the illustrated embodiment, each first recess 134 and corresponding engagement structure 140 are generally aligned with a gap G between adjacent first finger plates 130, see FIG. 4. Also in the illustrated embodiment, the number of engagement structures 140 generally equals the number of first finger plates 130.

A first spring ring 150 is in engagement with the first engagement structures 140, see FIGS. 2 and 3. In the illustrated embodiment, the first spring ring 150 comprises an annular dished ring. A first load-applying structure 160 is coupled to the frame 102 to impart a load to the first spring ring 150. In FIG. 2, either no load or only a small load is being applied to the first spring ring 150. In FIG. 3, a substantial load is being applied to the first spring ring 150 via the load-applying structure 160. The spring ring 150 may transfer the load to the stator core 110 via the first engagement structures 140, the first spacer plate 132 and the first finger plates 130.

Each first engagement structure 140 comprises a first bushing 142 and a first bolt 144. The first bolt 144 is in threaded engagement with the bushing 142. The first bushing 142 is capable of sliding movement within its corresponding first recess 134 relative to the first spacer plate 132. The bushing 142 may be made from a non-magnetic steel alloy. Because of the oval shape of the recess 134 and the slightly smaller oval shape of the bushing 142, the bushing 142 is only capable of radial sliding movement relative to the first spacer plate 132, see FIG. 4.

The bolt 144 may have a first end 144A in contact with the first spring ring 150. In the illustrated embodiment, the first spring ring 150 includes a recess 150A for receiving the bolt first end 144A. A second end 144B of the bolt 144 comprises a threaded stem extending through the corresponding first recess 134 and into the corresponding bore 135. An O-ring 146 is fitted over the second end 144B. The length of the bolt second end 144B, the size of the corresponding bore 135 and the size of the O-ring are designed so that each first engagement structure 140 remains in its corresponding first recess 134 and first bore 135 during assembly of the clamping structure 120 and prior to the first spring ring 150 making contact with the first ends 144A of the first bolts 144.

The first load-applying structure 160 may comprise a plurality of mounting bars 162 fixed to the frame 102 via brackets 102A; an annular first clamp ring 164; a plurality of first core studs 166 extending through bores 164A in the first clamp ring 164 and threadedly engaging threaded bores 162A in the mounting bars 162; and a plurality of first nuts 168 coupled to the core studs 166 so as to urge the clamp ring 164 in a direction to apply a load to the first spring ring 150.

Figure 1:
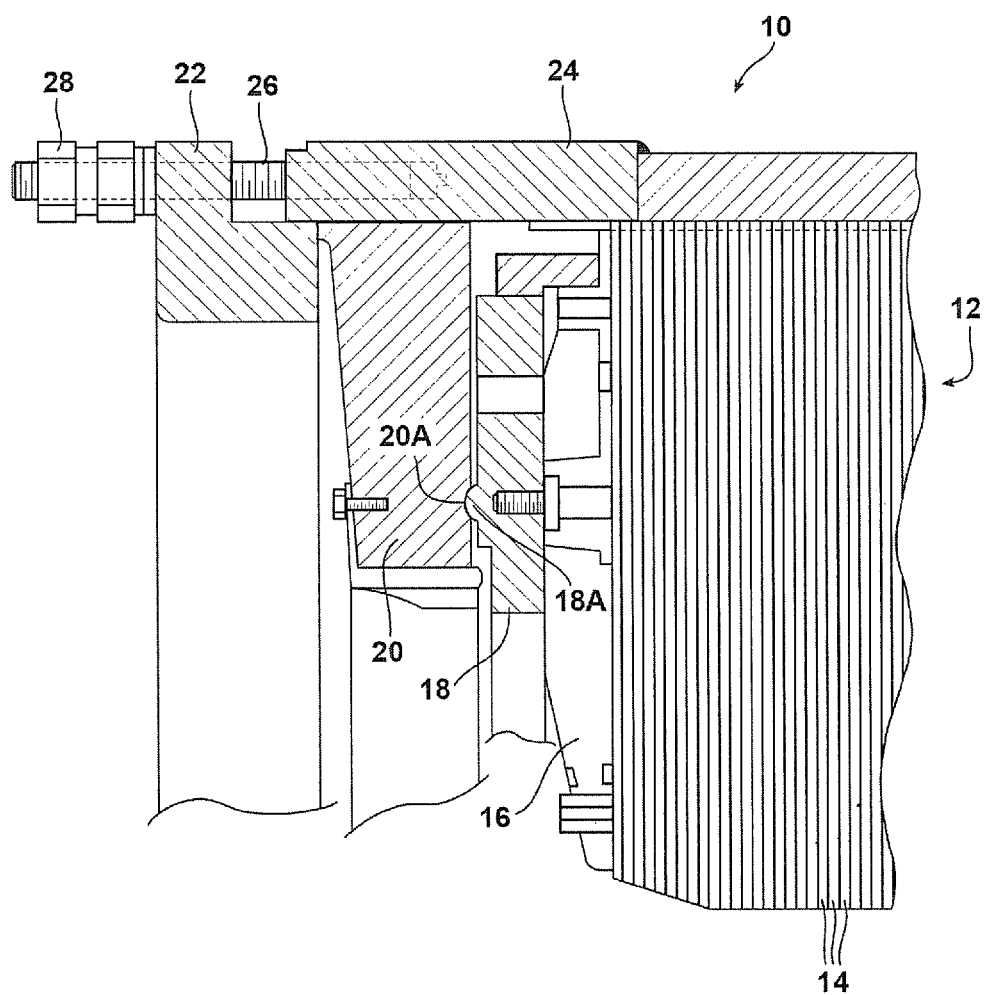
FIG. 1, partially in cross section, illustrates a prior art electrical generator.

As a load is being applied to the first spring ring 150, it moves axially so as to apply the load to the plurality of first bolts 144, which, in turn apply the load to the first spacer plate 132, the first finger plates 130 and the stator core first end 110A. As noted above, in FIG. 2 either no load or only a small load is being applied to the first spring ring 150 and in FIG. 3 a substantial load is being applied to the first spring ring 150. As the load is being applied to the first spring ring 150 to effect axial movement of the spring ring 150, the first spring ring 150 also moves radially a small distance, e.g., moves radially inward at a ratio of approximately 1:3 in comparison to axial movement along a stator core centerline. Because the first bolts 144 are threadedly coupled to the bushings 142, which, as noted above, are capable of sliding movement relative to the first spacer plate 132, the first bolts 144 and the bushings 142 move radially with the first spring ring 150 relative to the first spacer plate 132. This is in contrast to the prior art embodiment illustrated in FIG. 1, where the protrusion 18A in the mating groove 20A tended to cause the spacer plate 18 and, hence, the finger plates 16 coupled to the spacer plate 18, to move radially with the spring ring 20. In the present invention, it is believed that the first bolts 144 and corresponding bushings 142 allow the first spring ring 150 to move radially independent of the first spacer plate 132 and the first finger plates 130. Hence, it is believed that the first finger plates 130 do not cause stator core lamination movement when the first spring ring 150 moves radially.

Further, because the bolts 144 are threaded to the bushings 142, the distance of each bolt first end 144A relative to the spring plate 150 can be adjusted during assembly to take into consideration any flatness deviations in the stator core first end 110A.

The clamping structure 120 may further comprise a plurality of second finger plates (not shown) positioned adjacent to one another and engaging a second end of the stator core 110; a second spacer plate (not shown) associated with the second finger plates and including a plurality of spaced apart second recesses; a plurality of second engagement structures (not shown), each positioned within a corresponding second recess of the second spacer plate; a second spring ring in engagement with the second engagement structures; and second load-applying structure coupled to the frame to impart a load to the second spring ring. The second spring ring transfers the load to the stator core via the second engagement structures, the second spacer plate and the second finger plates. The plurality of second engagement structures may be capable of radial movement with the second spring ring and relative to the second spacer plate as the load is imparted to the second spring ring. The second finger plates, the second spacer plate, the second engagement structures, the second spring ring and the second load-applying structure may be configured and function in the same manner as the first finger plates, the first spacer plate, the first engagement structures, the first spring ring and the first load-applying structure discussed above.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A generator comprising:
    a frame;
    a stator core comprising laminations stacked in said frame;
    clamping structure to axially clamp said laminations together comprising:
        a plurality of first finger plates positioned adjacent to one another and engaging a first end of said stator core;
        a first spacer plate associated with said first finger plates, wherein said first spacer plate is ring-shaped and comprises a plurality of first recesses circumferentially spaced apart from one another, each of said first recesses having an oval shape with its longest dimension extending radially;
        a plurality of first engagement structures, wherein each of said first engagement structures comprises a bushing capable of sliding movement relative to said first spacer plate and a bolt in threaded engagement with said bushing;
        a first spring ring in engagement with said first engagement structures; and
        first load-applying structure coupled to said frame to impart a load to said first spring ring, wherein said spring ring transfers the load to said stator core via said first engagement structures, said first spacer plate and said first finger plates, said plurality of first engagement structures being capable of radial movement with said first spring ring and relative to said first spacer plate as the load is imparted to said first spring ring.

2. The generator as set forth in claim 1, wherein each of said first engagement structures is generally aligned with a gap between adjacent finger plates.

3. The generator as set forth in claim 1, wherein said bolt has a first end in contact with said first spring ring and a second end having an O-ring coupled to it.

4. The generator as set forth in claim 1, wherein said first spring ring comprises an annular dished ring.

5. The generator as set forth in claim 1, wherein said first load-applying structure comprises:
    a plurality of mounting bars fixed to said frame;
    an annular first clamp ring;
    a plurality of first core studs extending through said first clamp ring and threadedly engaging said mounting bars; and
    a plurality of first nuts coupled to said core studs so as to cause said clamp ring to apply the load to said first spring ring.

6. The generator as set forth in claim 1, wherein said first finger plates are bolted to said spacer plate.

7. The generator as set forth in claim 1, wherein clamping structure further comprises:
    a plurality of second finger plates positioned adjacent to one another and engaging a second end of said stator core;
    a second spacer plate associated with said second finger plates and including a plurality of spaced apart second recesses;
    a plurality of second engagement structures, each positioned within a corresponding second recess of said second spacer plate, said second engagement structures being slidable relative to said second spacer plate;
    a second spring ring in engagement with said second engagement structures; and
    second load-applying structure coupled to said frame to impart a load to said second spring ring, wherein said second spring ring transfers the load to said stator core via said second engagement structures, said second spacer plate and said second finger plates, said plurality of second engagement structures being capable of radial movement with said second spring ring and relative to said second spacer plate as the load is imparted to said second spring ring.

8. A generator comprising:
    a frame;
    a stator core comprising laminations stacked in said frame;
    clamping structure to axially clamp said laminations together comprising:
        a plurality of first finger plates positioned adjacent to one another and engaging a first end of said stator core;
        a first spacer plate associated with said first finger plates and including a plurality of spaced apart first recesses;
        a plurality of first engagement structures, each positioned within a corresponding first recess and comprising a bolt and a slidable bushing;
        a first spring ring in engagement with said first engagement structures, wherein said bolt has a first end in contact with said first spring ring, said bolt being in threaded engagement with said slidable bushing such that a distance of said first end of each bolt relative to said first spring ring being adjustable in an axial direction; and
        first load-applying structure coupled to said frame to impart a load to said first spring ring.

9. The generator as set forth in claim 8, wherein said first spacer plate is ring-shaped and said first recesses are circumferentially spaced apart from one another.

10. The generator as set forth in claim 9, wherein each of said first engagement structures is generally aligned with a gap between adjacent finger plates.

11. The generator as set forth in claim 8, wherein each of said first recesses has an oval shape with its longest dimension extending radially.

12. The generator as set forth in claim 8, wherein each of said first engagement structures further comprises an O-ring coupled to a second end of said bolt so as to prevent said bolt and corresponding bushing from dropping out of said corresponding recess prior to said spring ring being positioned adjacent said first engagement structures.

13. The generator as set forth in claim 8, wherein said first spring ring comprises an annular dished ring.

14. The generator as set forth in claim 8, wherein said first load-applying structure comprises:
- a plurality of mounting bars fixed to said frame;
- an annular first clamp ring;
- a plurality of first core studs extending through said first clamp ring and threadedly engaging said mounting bars; and
- a plurality of first nuts coupled to said core studs so as to cause said clamp ring to apply the load to said first spring ring.

15. The generator as set forth in claim 8, wherein said first finger plates are bolted to said spacer plate.

16. A generator comprising:
- a frame;
- a stator core comprising laminations stacked in said frame;
- clamping structure to axially clamp said laminations together comprising:
    - a plurality of first finger plates positioned adjacent to one another and engaging a first end of said stator core;
    - a first spacer plate associated with said first finger plates and including a plurality of spaced apart first recesses;
    - a plurality of first engagement structures, each positioned within a corresponding first recess and comprising a bolt and a slidable bushing;
    - a first spring ring in engagement with said first engagement structures; and
    - first load-applying structure coupled to said frame to impart a load to said first spring ring,
- wherein each of said first engagement structures further comprises an O-ring coupled to a second end of said bolt so as to prevent said bolt and corresponding bushing from dropping out of said corresponding recess prior to said spring ring being positioned adjacent said first engagement structures.

17. The generator as set forth in claim 8, wherein said first spring ring comprises a recess for receiving said first end of said bolt.

* * * * *